(12) United States Patent
Lin et al.

(10) Patent No.: US 9,277,453 B2
(45) Date of Patent: Mar. 1, 2016

(54) METHOD AND A SYSTEM FOR TRANSMITTING PILOT

(75) Inventors: Zhirong Lin, Shenzhen (CN); Shuqiang Xia, Shenzhen (CN); Guanghui Yu, Shenzhen (CN); Chunli Liang, Shenzhen (CN); Bo Dai, Shenzhen (CN); Peng Hao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 107 days.

(21) Appl. No.: 14/003,584

(22) PCT Filed: Aug. 1, 2011

(86) PCT No.: PCT/CN2011/077883
§ 371 (c)(1),
(2), (4) Date: Sep. 6, 2013

(87) PCT Pub. No.: WO2012/119368
PCT Pub. Date: Sep. 13, 2012

(65) Prior Publication Data
US 2014/0029428 A1 Jan. 30, 2014

(30) Foreign Application Priority Data
Mar. 8, 2011 (CN) .......................... 2011 1 0056045

(51) Int. Cl.
*H04W 28/12* (2009.01)
*H04L 5/00* (2006.01)
*H04W 28/06* (2009.01)
*H04W 48/08* (2009.01)

(52) U.S. Cl.
CPC ............. *H04W 28/12* (2013.01); *H04L 5/0048* (2013.01); *H04L 5/0094* (2013.01); *H04W 28/06* (2013.01); *H04W 48/08* (2013.01)

(58) Field of Classification Search
None
See application file for complete search history.

(56) References Cited

U.S. PATENT DOCUMENTS

| 2007/0104151 A1 | 5/2007 | Papasakellariou | |
| 2009/0268685 A1* | 10/2009 | Chen et al. | ..................... 370/329 |

(Continued)

FOREIGN PATENT DOCUMENTS

| CN | 101106395 A | 1/2008 |
| CN | 101162987 A | 4/2008 |
| CN | 101374257 A | 2/2009 |

(Continued)

OTHER PUBLICATIONS

International Search Report in international application number: PCT/CN2011/077883, mailed on Dec. 15, 2011.

(Continued)

*Primary Examiner* — Diane Lo
(74) *Attorney, Agent, or Firm* — Oppedahl Patent Law Firm LLC

(57) ABSTRACT

The disclosure discloses a method for transmitting a pilot, which includes the step of: selectively transmitting or not transmitting a demodulation pilot in a subframe according to a setting, in a control signaling, of triggering or not triggering a demodulation pilot transmission in the subframe. A system for transmitting the pilot is further disclosed, which includes a pilot selectively transmitting unit configured to selectively transmit or not transmit a demodulation pilot in a subframe according to a setting, in a control signaling, of triggering or not triggering a demodulation pilot transmission in the subframe. The method and system of the disclosure are capable of reducing the pilot overhead and improving the capacity of the LTE/LTE-Advanced system.

8 Claims, 2 Drawing Sheets

---

101: A control signaling is transmitted, in which a setting of triggering or not triggering a demodulation pilot transmission in a subframe is set.

↓

102: A base station or a mobile station selectively transmits or does not transmit a demodulation pilot in the subframe according to the setting of triggering or not triggering a demodulation pilot transmission in the subframe.

(56) References Cited

U.S. PATENT DOCUMENTS

2011/0044181 A1    2/2011  Suo
2012/0106471 A1*   5/2012  Behravan et al. ............. 370/329

FOREIGN PATENT DOCUMENTS

| CN | 101415233 | 4/2009 |
| CN | 101568165 A | 10/2009 |
| CN | 101577614 A | 11/2009 |

OTHER PUBLICATIONS

English Translation of the Written Opinion of the International Search Authority in international application number: PCT/CN2011/077883, mailed on Dec. 15, 2011.

* cited by examiner

Fig 1

```
101: A control signaling is transmitted, in which a setting of
triggering or not triggering a demodulation pilot transmission
in a subframe is set.
                            │
                            ▼
102: A base station or a mobile station selectively transmits
or does not transmit a demodulation pilot in the subframe
according to the setting of triggering or not triggering a
demodulation pilot transmission in the subframe.
```

Fig 2

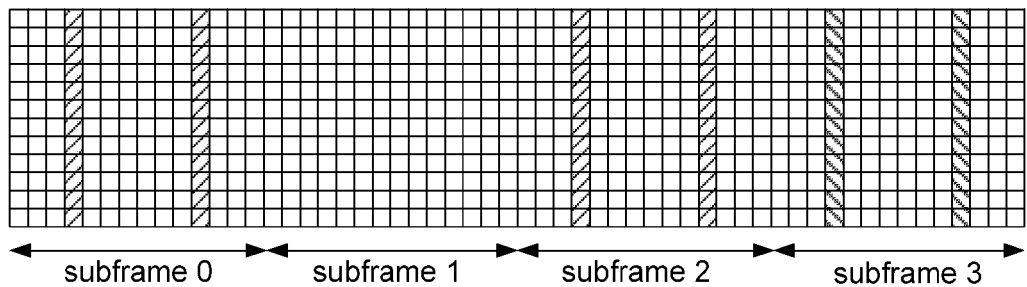

Fig 3

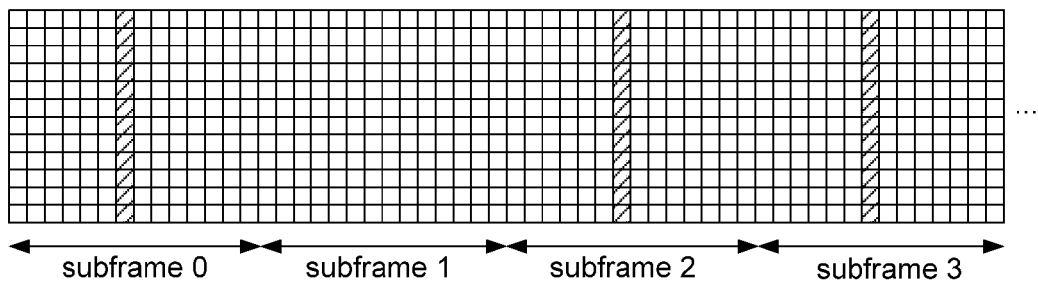

Fig 4

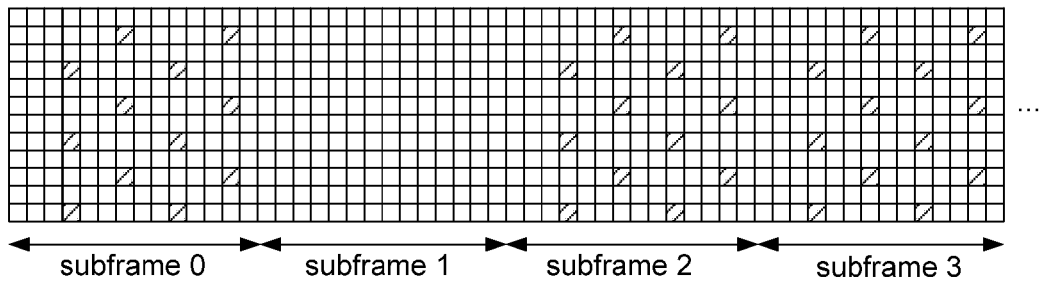

US 9,277,453 B2…

METHOD AND A SYSTEM FOR TRANSMITTING PILOT

TECHNICAL FIELD

The disclosure relates to the field of digital communications, in particular to an advanced method and a system for transmitting a pilot in 3GPP LTE (Long Term Evolution)/LTE-Advanced (Long Term Evolution-Advanced) indoor or hotspots coverage.

BACKGROUND

With the popularization of the mobile internet and the smart phone, requirements for the mobile data traffic are growing fast. In the next decade (2011-2020), the mobile data traffic will double every year, and will be increased by a thousand times in ten years.

The increase of the percentage of the data service in the operators' networks affects the conventional carrier-grade service. However, the earnings growth of the data service is not proportional to the traffic load, since the data service is billed on the data traffic. In addition, the fast-growing data service poses severe challenges to the transmission capacity of the mobile network. Most of mobile data services mainly occur indoor and in hotspots environment, which is embodied as nomadism/local wireless access scenes. According to statistics, almost 70% of the present mobile data services occur indoor, and the percentage will be growing continuously and will exceed 80% by 2012. Therefore, the solution to the high-speed data service for the indoor coverage and hotspot coverage is imperative to the operator.

As to the data service for the indoor coverage and hotspot coverage, its features are: on one side, the users are generally fixed users or users moving in low speed; the user have no high requirement of mobility, thereby having the feature that the wireless channel has small delay spread and the circumstance of the wireless channel changes slowly; on the other side, the data service is mainly the internet service based on the IP (Internet Protocol), and the requirements thereof to QoS are relatively simple and are far below the carrier-grade service's requirements. After the LTE/LTE-Advanced technology is introduced, the LTE/LTE-Advanced system is mainly applied to the circumstances with large coverage area (500-1000 kilometers) and various channels (with a rate from 3 kilometers per hour to 350 kilometers per hour, and a channel delay from less than one microsecond to less than twenty microseconds) and is not suitable for the application circumstance of the conventional the data service for the indoor coverage and hotspot coverage. Thus, when the LTE/LTE-Advanced system carries IP data package service with massive data flow and low rate, the use of the conventional solution to pilot transmission for the data service for the indoor coverage and hotspot coverage will cause problems such as too much pilot overhead, low efficiency and high cost. In the conventional solution to pilot transmission for the data service for the indoor coverage and hotspot coverage, each uplink/downlink subframe transmits the demodulation pilot, which certainly will cause problems such as too much pilot overhead, low efficiency and high cost. Therefore, when applying the LTE/LTE-Advanced technology to such channel circumstances as indoor and hotspots coverage with high rate, it is necessary and urgent to reduce the pilot overhead and improve system capacity to avoid the above problems.

SUMMARY

The purpose of the disclosure is to provide a method and a system for transmitting a pilot, which are capable of reducing the pilot overhead and improving the capacity of the LTE/LTE-Advanced system.

For the above purpose, the disclosure provides the following technical solutions.

A method for transmitting a pilot is provided, which includes the following step:

selectively transmitting or not transmitting a demodulation pilot in a subframe according to a setting, in a control signaling, of triggering or not triggering a demodulation pilot transmission in the subframe.

Preferably, the setting of triggering or not triggering a demodulation pilot transmission in the subframe may include: being realized in an instruction manner in the control signaling; and the instruction manner is that an eNode B instructs through the control signaling whether or not transmitting the demodulation pilot in a resource allocated to a user equipment.

Preferably, when a service is a semi-persistent scheduling service, the instruction manner is that the eNode B instructs, through an RRC signaling, in which subframes the demodulation pilot is transmitted.

Preferably, when a service is a dynamic scheduling service, the instruction manner is that the eNode B instructs, by setting corresponding bit of a physical control channel as 1 or 0, triggering or not triggering the demodulation pilot transmission in the subframe.

Preferably, when the resource allocated to the user equipment by the eNode B is an uplink resource and the eNode B instructs, through the control signaling, triggering the demodulation pilot transmission in an uplink subframe, the method further includes that: the user equipment transmits the demodulation pilot over part or all of subcarriers at a specific fixed symbol location in the uplink subframe to which the allocated resource belongs; and when the resource allocated to the user equipment by the eNode B is an uplink resource and the eNode B instructs, through the control signaling, not triggering the demodulation pilot transmission in an uplink subframe, the method further includes that: the user equipment transmits user data at a specific fixed symbol location in the uplink subframe to which the allocated resource belongs.

Preferably, the fixed symbol location is a last OFDM or SC-FDMA symbol in a first slot in the subframe; or, the fixed symbol location is a fourth OFDM or SC-FDMA symbol in a first slot and a fourth OFDM or SC-FDMA symbol in a second slot in the subframe, when a cyclic prefix length of the uplink symbols is a normal length; or, the fixed symbol location is a third OFDM or SC-FDMA symbol in the first slot and a third OFDM or SC-FDMA symbol in the second slot in the subframe, when a cyclic prefix length of the uplink symbols is an extended length.

Preferably, when the resource allocated to the user equipment by the eNode B is a downlink resource and the eNode B instructs, through the control signaling, triggering the demodulation pilot transmission in a downlink subframe, the method further includes that: the eNode B transmits the demodulation pilot at a fixed time-frequency location in the downlink subframe to which the allocated resource belongs; and when the resource allocated to the user equipment by the eNode B is a downlink resource and the eNode B instructs, through the control signaling, not triggering the demodulation pilot transmission in a downlink subframe, the method further includes that: the eNode B transmits user data at the fixed time-frequency location in the downlink subframe to which the allocated resource belongs.

In another aspect, a system for transmitting a pilot is provided, which includes a pilot selectively transmitting unit. The pilot selectively transmitting unit is configured to selectively transmit or not transmit a demodulation pilot in a subframe according to a setting, in a control signaling, of triggering or not triggering a demodulation pilot transmission in the subframe.

Preferably, the setting of triggering or not triggering a demodulation pilot transmission in the subframe may include: being realized in an instruction manner in the control signaling; the instruction manner is that an eNode B instructs through the control signaling whether or not transmitting the demodulation pilot in a resource allocated to a user equipment.

Preferably, the pilot selectively transmitting unit may be further so configured that when the resource allocated to the user equipment by the eNode B is an uplink resource and the eNode B instructs, through the control signaling, triggering the demodulation pilot transmission in an uplink subframe, the user equipment transmits the demodulation pilot over part or all of subcarriers at a specific fixed symbol location in the uplink subframe to which the allocated resource belongs;

Preferably, the system further includes a user data transmitting unit. The user data transmitting unit may be so configured that when the resource allocated to the user equipment by the eNode B is an uplink resource and the eNode B instructs, through the control signaling, not triggering the demodulation pilot transmission in an uplink subframe, the user equipment transmits user data at a specific fixed symbol location in the uplink subframe to which the allocated resource belongs.

Preferably, the fixed symbol location may be a last OFDM symbol in a first slot in the subframe; or, the fixed symbol location may be a fourth OFDM symbol in a first slot and a fourth OFDM symbol in a second slot in the subframe, when a cyclic prefix length of the uplink symbols is a normal length; or, the fixed symbol location may be a third OFDM symbol in the first slot and a third OFDM symbol in the second slot in the subframe, when a cyclic prefix length of the uplink symbols is an extended length.

Preferably, the pilot selectively transmitting unit may be further so configured that when the resource allocated to the user equipment by the eNode B is a downlink resource and the eNode B instructs, through the control signaling, triggering the demodulation pilot transmission in a downlink subframe, the eNode B transmits the demodulation pilot at a fixed time-frequency location in the downlink subframe to which the allocated resource belongs;

Preferably, the system may further include a user data transmitting unit. The user data transmitting unit may be so configured that when the resource allocated to the user equipment by the eNode B is a downlink resource and the eNode B instructs, through the control signaling, not triggering the demodulation pilot transmission in a downlink subframe, the eNode B transmits user data at a fixed time-frequency location in the downlink subframe to which the allocated resource belongs.

According to the setting, in the control signaling, of triggering or nor triggering demodulation pilot in a subframe, the demodulation pilot of the disclosure can be selectively transmitted or not transmitted in the subframe. According to the disclosure, the demodulation pilot is not transmitted in every subframe, which is different from the prior art. The solution of selectively transmitting the demodulation pilot in subframes is capable of reducing pilot overhead and improving the capacity of the LTE/LTE-Advanced system.

BRIEF DESCRIPTION OF THE DRAWINGS

FIG. 1 shows a flowchart for realizing the principle of the pilot transmission method according to the disclosure;

FIG. 2 shows a diagram of a pilot pattern according to the disclosure, in which a UE transmits an uplink demodulation pilot over the fourth SC-FDMA symbols respectively in the first and second slots in a uplink subframe, when the uplink demodulation pilot is triggered;

FIG. 3 shows a diagram of the pilot pattern according to the disclosure, in which the UE transmits the uplink demodulation pilot over the last SC-FDMA symbol in the first slot in the uplink subframe, when the uplink demodulation pilot is triggered;

FIG. 4 shows a diagram of the pilot pattern when an eNode B transmits a downlink demodulation pilot according to the disclosure, when the uplink demodulation pilot is triggered and the length of CP is a normal length;

DETAILED DESCRIPTION

Figure 5:
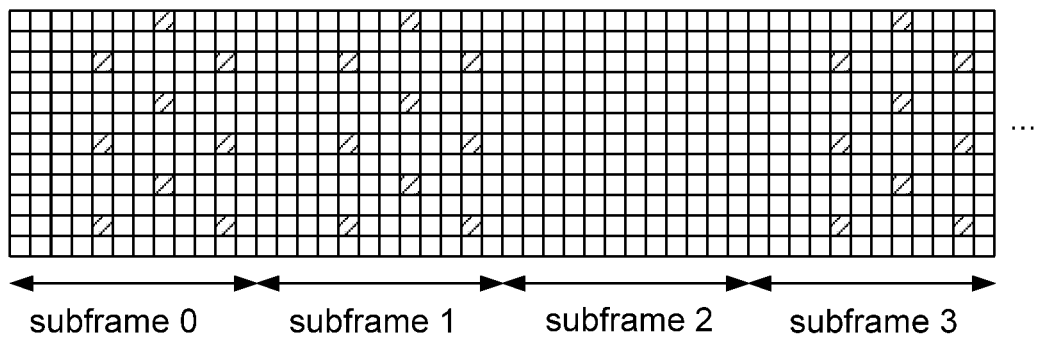
FIG. 5 shows a diagram of the pilot pattern when the eNode B transmits the downlink demodulation pilot according to the disclosure, when the uplink demodulation pilot is triggered and the length of CP is an extended length.

The basic idea of the disclosure is to selectively transmit or not transmit a demodulation pilot in a subframe according to a setting, in a control signaling, of triggering or not triggering a demodulation pilot transmission in the subframe.

Hereinafter, the solution of the disclosure will be described in detail in conjunction with the drawings.

The pilot transmission solution of the disclosure is capable of reducing the pilot overhead and improving the LTE/LTE-Advanced system capacity, so as to address problems, such as too much pilot overhead, low efficiency and high cost, in the application scene of data service deployment of indoor or hotspot coverage of the LTE/LTE-Advanced technology. In the above application scene, there are one eNode B and at least one user equipment. The eNode B has the capability of transmitting the control information and the user data to the user equipment, and receiving data from one or more user equipments.

In one aspect of the disclosure, a method for transmitting a pilot is provided, which includes the following step:

selectively transmitting or not transmitting a demodulation pilot in a subframe according to a setting, in a control signaling, of triggering or not triggering a demodulation pilot transmission in the subframe.

Preferably, the setting of triggering or not triggering a demodulation pilot transmission in the subframe may include: being realized in an instruction manner in the control signaling. The instruction manner is that an eNode B instructs through the control signaling whether or not transmitting the demodulation pilot in a resource allocated to a user equipment.

Preferably, when a service is a semi-persistent scheduling service, the instruction manner is that the eNode B instructs, through an RRC signaling, in which subframes the demodulation pilot is transmitted.

Preferably, when a service is a dynamic scheduling service, the instruction manner is that the eNode B instructs, by setting corresponding bit of a Physical Control Channel (PDCCH) as 1 or 0, triggering or not triggering the demodulation pilot transmission in the subframe. For example, when the corresponding bit of the PDCCH is set as 1, the eNode B instructs that the demodulation pilot transmission in the subframe is triggered; when the corresponding bit of the PDCCH is set as 0, the eNode B instructs that the demodulation pilot transmission in the subframe is not triggered.

Preferably, when the resource allocated to the user equipment by the eNode B is an uplink resource (i.e., the user equipment transmits data and the eNode B receives the data) and the eNode B instructs, through the control signaling, triggering the demodulation pilot transmission in an uplink subframe, the user equipment transmits the demodulation pilot over part or all of subcarriers at a specific fixed symbol location in the uplink subframe to which the allocated resource belongs; and when the resource allocated to the user equipment by the eNode B is an uplink resource and the eNode B instructs, through the control signaling, not triggering the demodulation pilot transmission in an uplink subframe, the user equipment transmits user data at a specific fixed symbol location in the uplink subframe to which the allocated resource belongs. In other words, the user equipment transmits the user data at the location where the demodulation pilot is transmitted.

It should be noted that the subcarrier of the disclosure is a concept of a frequency domain resource and the number of subcarriers represents the amount of the frequency domain resource, while the subframe of the disclosure is a concept of a time domain resource and the number of subframes represents the amount of the time domain resource. A pilot signal in one subframe may occupy a plurality of subcarriers. The relationship between the subframe and the subcarrier is as follows: one subframe is composed of a plurality of OFDM symbols; one OFDM symbol is composed of a plurality of subcarriers; when the OFDM transmits a signal, the more the subcarriers are included in the OFDM, the wider the bandwidth of the transmitted signal is.

Preferably, the fixed symbol location may includes:
the last OFDM symbol in a first slot in the subframe; or,
a fourth OFDM symbol in a first slot and a fourth OFDM symbol in a second slot in the subframe (when a cyclic prefix length of the uplink symbols is a normal length); or,
a third OFDM symbol in the first slot and a third OFDM symbol in the second slot in the subframe (when a cyclic prefix length of the uplink symbols is an extended length).

It should be noted that the above subframe is the subframe which is able to trigger the demodulation pilot transmission.

Furthermore, when the user equipment needs to transmit the plurality of orthogonal demodulation pilots, the transmission of a plurality of orthogonal demodulation pilots may be performed adopting a method such as code division and frequency division.

Preferably, when the resource allocated to the user equipment by the eNode B is a downlink resource (i.e., the eNode B transmits data, and the user equipment receives data) and the eNode B instructs, through the control signaling, triggering the demodulation pilot transmission in a downlink subframe, the user equipment transmits the demodulation pilot at a fixed time-frequency location in the downlink subframe to which the allocated resource belongs; and when the resource allocated to the user equipment by the eNode B is a downlink resource and the eNode B instructs, through the control signaling, not triggering the demodulation pilot transmission in a downlink subframe, the user equipment transmits user data at the fixed time-frequency location in the downlink subframe to which the allocated resource belongs. In other words, the user equipment transmits the user data at the location where the above demodulation pilot is transmitted.

Hereinafter, the exemplary embodiments of the disclosure will be described.

As shown in FIG. 1, the flowchart for realizing the principle of the method for transmitting a pilot according to the disclosure includes the following steps:

Step 101: A control signaling is transmitted, in which a setting of triggering or not triggering a demodulation pilot transmission in a subframe is set.

Step 102: An eNode B or a user equipment selectively transmits or does not transmit a demodulation pilot in the subframe according to the setting of triggering or not triggering a demodulation pilot transmission in the subframe.

The examples for the transmission of the demodulation pilot are as follows.

Example 1

Assuming that the transmission of the uplink demodulation pilot is triggered in subframes 0, 2 and 3 in the uplink signal, the Cyclic Prefix (CP) length of the uplink signal is a normal length, and the UE transmits the uplink demodulation pilot over fourth OFDM symbols respectively in the first and second slots in the uplink subframe, the pilot pattern for the above uplink demodulation pilot transmission is as shown in FIG. 2. No uplink demodulation pilot transmission id triggered in subframe 1, therefore, the transmission location in the subframe 1 is used to transmit the user uplink data. In FIG. 2,  represents the location where the pilot signal transmitted by the demodulation pilot is; ☐ represents the location where the user data transmitted by the user data is.

Example 2

Assuming that the transmission of uplink demodulation pilot is triggered in subframes 0, 2 and 3 in the uplink signal, the cyclic prefix length of the uplink signal is a normal length, and the UE transmits the uplink demodulation pilot over the last OFDM symbol in the first slot in the uplink subframe, the pilot pattern for the above uplink demodulation pilot transmission is as shown in FIG. 3. No uplink demodulation pilot transmission is triggered in subframe 1, therefore, the pilot transmission location in the subframe 1 is used to transmit the user uplink data. In FIG. 3,  represents the location where the pilot signal transmitted by the demodulation pilot is; ☐ represents the location where the user data transmitted by the user data is.

Example 3

Assuming that the transmission of downlink demodulation pilot is triggered in subframes 0, 2 and 3 in the downlink signal, the cyclic prefix length of the downlink signal is a normal length, and the eNode B transmits the downlink demodulation pilot through antenna port 5, the pilot pattern transmitted by the eNode B is as shown in FIG. 4. No downlink demodulation pilot transmission is triggered in subframe 1, therefore, the pilot transmission location in the subframe 1 is used to transmit the downlink data. In FIG. 4, ▨ represents the location where the pilot signal transmitted by the demodulation pilot is; ☐ represents the location where the user data transmitted by the user data is.

Example 4

Assuming that the transmission of downlink demodulation pilot is triggered in subframes 0, 1 and 3 in the downlink signal, the cyclic prefix length of the downlink signal is an extended length, and the eNode B transmits the downlink demodulation pilot through antenna port 5, the pilot pattern transmitted by the eNode B is as shown in FIG. 5. No downlink demodulation pilot transmission is triggered in subframe 2, therefore, the pilot transmission location in the subframe 2 is used to transmit the downlink data. In FIG. 5, ▨ represents the location where the pilot signal transmitted by the demodulation pilot is; ☐ represents the location where the user data transmitted by the user data is.

Example 5

Figure 6:
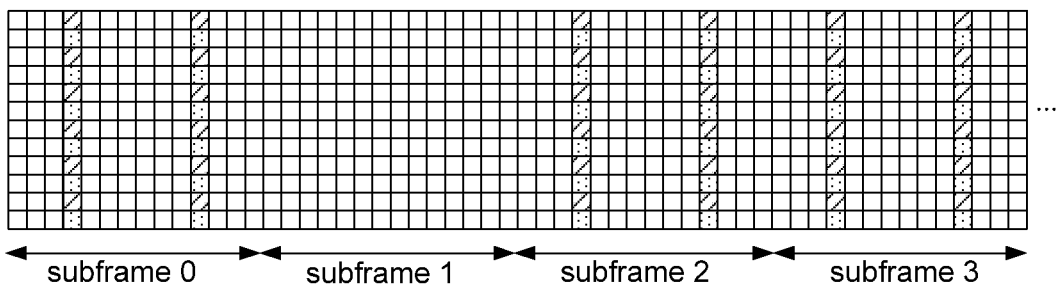
FIG. 6 shows a diagram of the pilot pattern according to the disclosure, when the uplink demodulation pilot is triggered and the orthogonal pilot transmission for multiple users is realized through frequency division.

Assuming that the transmission of uplink demodulation pilot is triggered in subframes 0, 2 and 3 in the uplink signal, the cyclic prefix length of the uplink signal is a normal length, and the UE transmits the uplink demodulation pilot over fourth OFDM symbols respectively in the first and second slots in the uplink subframe and transmits two orthogonal pilot signals by adopting frequency division method, the pilot pattern for the above uplink demodulation pilot transmission is as shown in FIG. 6. In FIG. 6, different pilot signals are set over subcarriers with different frequencies in one symbol. No uplink demodulation pilot transmission is triggered in subframe 1, therefore, the pilot transmission location in subframe 1 is used to transmit the user uplink data. In FIG. 6, ▨ represents the location where pilot signal 1 transmitted by the demodulation pilot is; ▦ represents the location where pilot signal 2 transmitted by the demodulation pilot is; ☐ represents the location where the user data transmitted by the user data is.

Example 6

Figure 7:
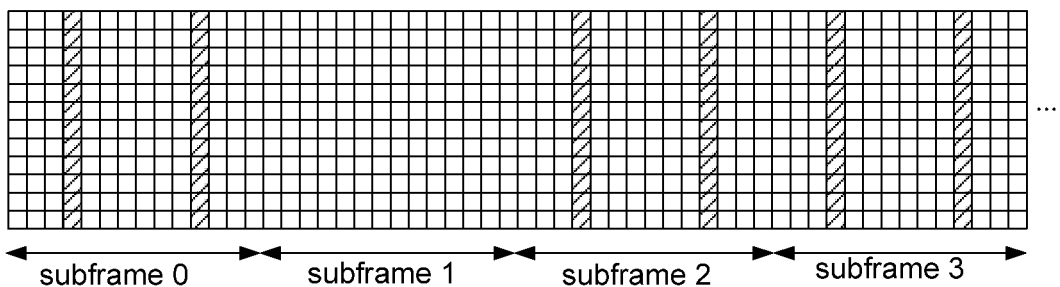
FIG. 7 shows a diagram of the pilot pattern according to the disclosure, when the uplink demodulation pilot is triggered and the orthogonal pilot transmission for multiple users is realized through code division.

Assuming that the transmission of uplink demodulation pilot is triggered in subframes 0, 2 and 3 in an uplink signal, the cyclic prefix length of the uplink signal is a normal length, and the UE transmits the uplink demodulation pilot over the fourth OFDM symbols respectively in the first and second slots in the uplink subframe and transmits two orthogonal pilot signals by adopting code division method, the pilot pattern for the above uplink demodulation pilot transmission is as shown in FIG. 7. In FIG. 7, different pilot signals are set in a same time-frequency resource and are distinguished through different orthogonal codes. In FIG. 7, no uplink demodulation pilot transmission is triggered in subframe 1, therefore, the pilot transmission location in the subframe 1 is used to transmit the user uplink data. In FIG. 7, ▨ represents the location where the pilot signals 1 and 2 transmitted by the demodulation pilot overlap; ☐ represents the location where the user data transmitted by the user data is.

Example 7

Figure 8:
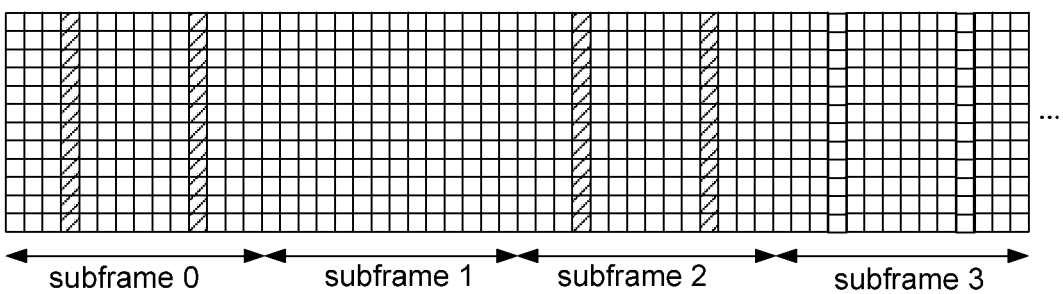
FIG. 8 shows a diagram of the pilot pattern according to the disclosure, in which the UE transmits the uplink demodulation pilot over the fourth SC-FDMA symbols respectively in the first and second slots in the uplink subframe, when the eNB instructs, through RRC configuration, the UE to transmit the uplink demodulation pilot in a fixed subframe.

Assuming that the UE is set by the eNB through RRC configuration to transmit the uplink demodulation pilot in subframe 0 and subframe 2 in the uplink signal, the cyclic prefix length of the uplink signal is a normal length, and the UE transmits the uplink demodulation pilot in fourth OFDM symbols respectively in the first and second slots in the uplink subframe, the pilot pattern for the above demodulation pilot transmission is as shown in FIG. 8. No uplink demodulation pilot transmission is triggered in subframes 1 and 3, therefore, pilot transmission locations in subframes 1 and 3 are used to transmit user uplink data. In FIG. 8, ▨ represents the location where the pilot signal transmitted by the demodulation pilot is; ☐ represents the location where the user data transmitted by the user data is.

In another aspect of the disclosure, a system for transmitting a pilot is provided, which includes a pilot selectively transmitting unit. The pilot selectively transmitting unit is configured to selectively transmit or not transmit a demodulation pilot in a subframe according to a setting, in a control signaling, of triggering or not triggering a demodulation pilot transmission in the subframe.

The setting of triggering or not triggering a demodulation pilot transmission in the subframe may include: being realized in an instruction manner in the control signaling; and the instruction manner is that an eNode B instructs through the control signaling whether or not transmitting the demodulation pilot in a resource allocated to a user equipment.

The pilot selectively transmitting unit may be further so configured that when the resource allocated to the user equipment by the eNode B is an uplink resource and the eNode B instructs, through the control signaling, triggering the demodulation pilot transmission in an uplink subframe, the user equipment transmits the demodulation pilot over part or all of subcarriers at a specific fixed symbol location in the uplink subframe to which the allocated resource belongs;

The system may further include a user data transmitting unit. The user data transmitting unit may be so configured that when the resource allocated to the user equipment by the eNode B is an uplink resource and the eNode B instructs, through the control signaling, not triggering the demodulation pilot transmission in an uplink subframe, the user equipment transmits user data at a specific fixed symbol location in the uplink subframe to which the allocated resource belongs.

The fixed symbol location is the last OFDM symbol in the first slot in the subframe; or, the fixed symbol location is the fourth OFDM symbol in the first slot and the fourth OFDM symbol in the second slot in the subframe, when a cyclic prefix length of the uplink symbols is a normal length; or, the fixed symbol location is the third OFDM symbol in the first slot and the third OFDM symbol in the second slot in the subframe, when a cyclic prefix length of the uplink symbols is an extended length.

The pilot selectively transmitting unit may be further so configured that when the resource allocated to the user equipment by the eNode B is a downlink resource and the eNode B instructs, through the control signaling, triggering the demodulation pilot transmission in a downlink subframe, the eNode B transmits the demodulation pilot at a fixed time-frequency location in the downlink subframe to which the allocated resource belongs.

The system may further include a user data transmitting unit. The user data transmitting unit is so configured that when the resource allocated to the user equipment by the eNode B is a downlink resource and the eNode B instructs, through the control signaling, not triggering the demodulation pilot transmission in a downlink subframe, the eNode B transmits user data at a fixed time-frequency location in the downlink subframe to which the allocated resource belongs.

The above described are only preferable embodiments, which do not intend to limit the protection scope of the disclosure.

The invention claimed is:

1. A method for transmitting a pilot, comprising:
selectively transmitting or not transmitting a demodulation pilot in a subframe according to a setting, in a control signaling, of triggering or not triggering a demodulation pilot transmission in the subframe,
wherein the setting of triggering or not triggering a demodulation pilot transmission in the subframe comprises: being realized in an instruction manner in the control signalling; and the instruction manner is that an eNode B instructs through the control signaling whether or not transmitting the demodulation pilot in a resource allocated to a user equipment, and
wherein when a service is a semi-persistent scheduling service, the instruction manner is that the eNode B instructs, through an RRC signaling, in which subframes the demodulation pilot is transmitted; and when a service is a dynamic scheduling service, the instruction manner is that the eNode B instructs, by setting corresponding bit of a physical control channel as 1 or 0, triggering or not triggering the demodulation pilot transmission in the subframe.

2. The method according to claim 1, wherein:
when the resource allocated to the user equipment by the eNode B is an uplink resource and the eNode B instructs, through the control signaling, triggering the demodulation pilot transmission in an uplink subframe, the method further comprising:
transmitting, by the user equipment, the demodulation pilot over part or all of subcarriers at a specific fixed symbol location in the uplink subframe to which the allocated resource belongs; and
when the resource allocated to the user equipment by the eNode B is an uplink resource and the eNode B instructs, through the control signaling, not triggering the demodulation pilot transmission in an uplink subframe, the method further comprising:
transmitting, by the user equipment, user data at a specific fixed symbol location in the uplink subframe to which the allocated resource belongs.

3. The method according to claim 2, wherein:
the fixed symbol location is a last OFDM symbol in a first slot in the subframe; or,
the fixed symbol location is a fourth OFDM symbol in a first slot and a fourth OFDM symbol in a second slot in the subframe, when a cyclic prefix length of the uplink symbols is a normal length; or,
the fixed symbol location is a third OFDM symbol in the first slot and a third OFDM symbol in the second slot in the subframe, when a cyclic prefix length of the uplink symbols is an extended length.

4. The method according to claim 1, wherein:
when the resource allocated to the user equipment by the eNode B is a downlink resource and the eNode B instructs, through the control signaling, triggering the demodulation pilot transmission in a downlink subframe, the method further comprising
transmitting, by the eNode B, the demodulation pilot at a fixed time-frequency location in the downlink subframe to which the allocated resource belongs; and
when the resource allocated to the user equipment by the eNode B is a downlink resource and the eNode B instructs, through the control signaling, not triggering the demodulation pilot transmission in a downlink subframe, the method further comprising:
transmitting, by the eNode B, user data at the fixed time-frequency location in the downlink subframe to which the allocated resource belongs.

5. A system for transmitting a pilot, comprising:
a pilot selectively transmitting unit configured to selectively transmit or not transmit a demodulation pilot in a subframe according to a setting, in a control signaling, of triggering or not triggering a demodulation pilot transmission in the subframe,
wherein wherein the setting of triggering or not triggering a demodulation pilot transmission in the subframe comprises: being realized in an instruction manner in the control signalling; and the instruction manner is that an eNode B instructs through the control signaling whether or not transmitting the demodulation pilot in a resource allocated to a user equipment, and
wherein when a service is a semi-persistent scheduling service, the instruction manner is that the eNode B instructs, through an RRC signaling, in which subframes the demodulation pilot is transmitted; and when a service is a dynamic scheduling service, the instruction manner is that the eNode B instructs, by setting corresponding bit of a physical control channel as 1 or 0, triggering or not triggering the demodulation pilot transmission in the subframe.

6. The system according to claim 5, wherein, the pilot selectively transmitting unit is further so configured that when the resource allocated to the user equipment by the eNode B is an uplink resource and the eNode B instructs, through the control signaling, triggering the demodulation pilot transmission in an uplink subframe, the user equipment transmits the demodulation pilot over part or all of subcarriers at a specific fixed symbol location in the uplink subframe to which the allocated resource belongs;
the system further comprising a user data transmitting unit;
the user data transmitting unit is so configured that when the resource allocated to the user equipment by the eNode B is an uplink resource and the eNode B instructs, through the control signaling, not triggering the demodulation pilot transmission in an uplink subframe, the user equipment transmits user data at a specific fixed symbol location in the uplink subframe to which the allocated resource belongs.

7. The system according to claim 6, wherein:
the fixed symbol location is a last OFDM symbol in a first slot in the subframe; or,
the fixed symbol location is a fourth OFDM symbol in a first slot and a fourth OFDM symbol in a second slot in the subframe, when a cyclic prefix length of the uplink symbols is a normal length; or,
the fixed symbol location is a third OFDM symbol in the first slot and a third OFDM symbol in the second slot in the subframe, when a cyclic prefix length of the uplink symbols is an extended length.

8. The system according claim 5, wherein, the pilot selectively transmitting unit is further so configured that when the resource allocated to the user equipment by the eNode B is a downlink resource and the eNode B instructs, through the control signaling, triggering the demodulation pilot transmission in a downlink subframe, the eNode B transmits the demodulation pilot at a fixed time-frequency location in the downlink subframe to which the allocated resource belongs;

the system further comprising a user data transmitting unit:

the user data transmitting unit is so configured that when the resource allocated to the user equipment by the eNode B is a downlink resource and the eNode B instructs, through the control signaling, not triggering the demodulation pilot transmission in a downlink subframe, the eNode B transmits user data at a fixed time-frequency location in the downlink subframe to which the allocated resource belongs.

* * * * *